Feb. 28, 1950     J. H. VIEWEGH     2,498,968
FAN GUARD MOUNTING
Filed March 7, 1945     2 Sheets-Sheet 1
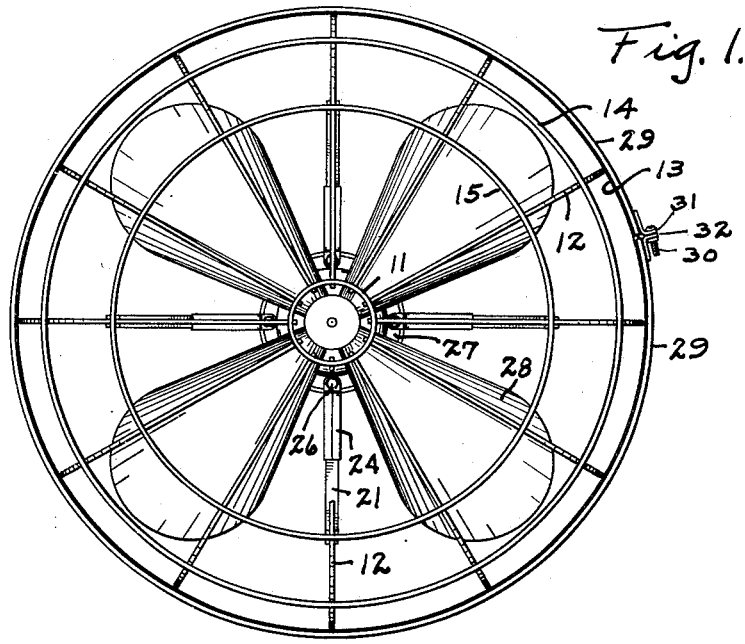
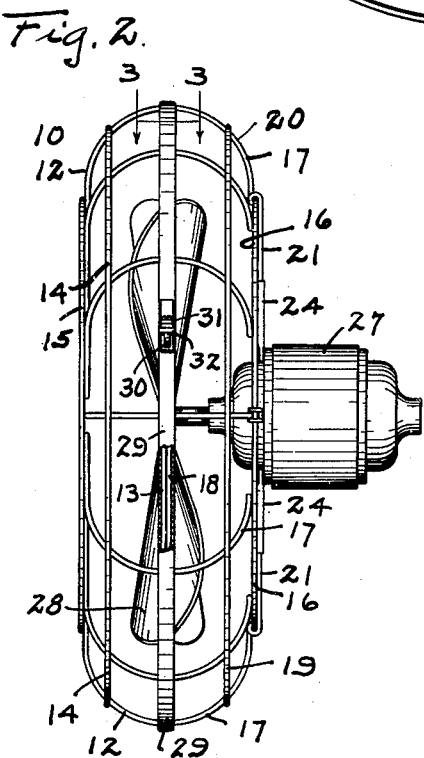
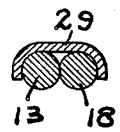
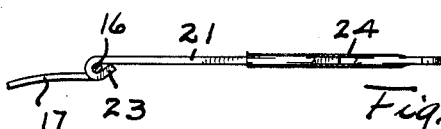
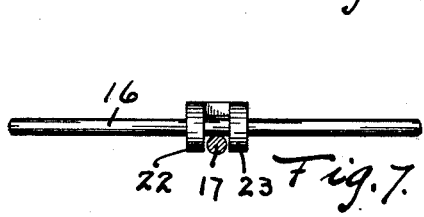
INVENTOR,
JOHN H. VIEWEGH,
By Herbert A. Minturn,
ATTORNEY.

Feb. 28, 1950      J. H. VIEWEGH      2,498,968
FAN GUARD MOUNTING

Filed March 7, 1945      2 Sheets-Sheet 2

INVENTOR,
JOHN H. VIEWEGH,
By Herbert A. Minturn,
ATTORNEY.

Patented Feb. 28, 1950

2,498,968

UNITED STATES PATENT OFFICE 2,498,968

FAN GUARD MOUNTING

John H. Viewegh, Indianapolis, Ind.

Application March 7, 1945, Serial No. 581,359

2 Claims. (Cl. 230—275)

This invention relates to a guard for rotary fans and has for a primary object the provision in a structure for adapting it to a wide range of fan blade sizes and fan driving motor sizes. A further important object of the invention is to so form the structure that it may be stored and shipped in a nested arrangement in order to materially reduce the overall dimensions when so nested.

Figure 4:
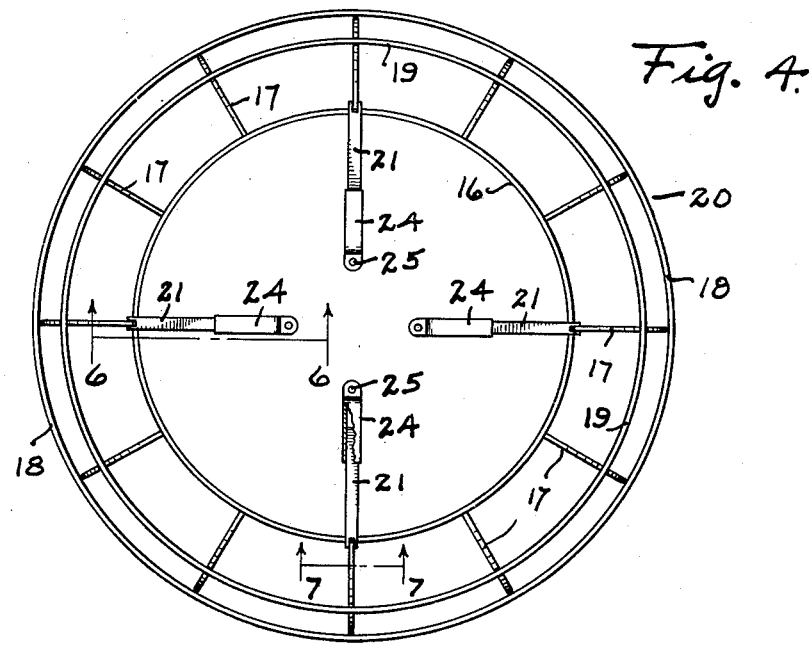
Figure 5:
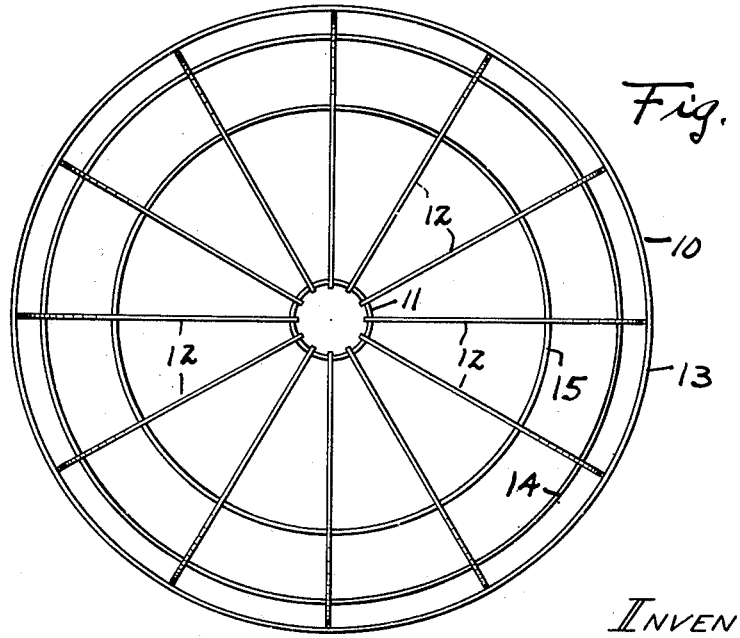

These and other important objects and advantages of the invention will become apparent to those versed in the art in the following description of one particular form of the invention as illustrated in the accompanying drawings, in which Fig. 1 is a view in front elevation of the structure embodying the invention as applied to a motor driven fan;

Fig. 2, a view in end elevation;

Fig. 3, a view in transverse section on the line 3—3 on an enlarged scale;

Fig. 4, a view of the fan guard in rear elevation apart from the motor;

Fig. 5, a view in rear elevation of the front section of the guard;

Fig. 6, a view in partial section on the line 6—6 in Fig. 4 on an enlarged scale; and Fig. 7, a view in section on the line 7—7 in Fig. 4 on an enlarged scale.

Like characters of reference indicate like parts throughout the several views in the drawings.

Referring first to Fig. 5, a front half or section generally designated by the numeral 10 is formed to have a center ring 11 from which radiates a plurality of bars or wires 12, herein shown as twelve in number, each of which wires 12 has its outer end curved around rearwardly to join a maximum diameter ring 13 spaced in a plane rearwardly of the plane of the small center and forwardly disposed ring 11, the planes of both rings being parallel one to the other. Located on the curves of the wires 12 is a third ring 14. A fourth ring 15 smaller in diameter than the ring 14 (ring 14 being smaller in diameter than the ring 13) is located on the straight portions of the wires 12 substantially at the positions thereof from which the wire starts curving rearwardly. All of these parts so far described are interconnected one with the other by any suitable means, such as by arc welding or the like.

The rear portion of the guard generally designated by the numeral 20 has a rearwardly disposed ring 16 with a diameter substantially the same as that of the ring 15 in the forward section. Fixed to and extending around forwardly from this ring 16 is a plurality of bars or wires 17, herein shown as twelve in number. Each of the wires 17 curves around forwardly with substantially the same degree of curvature as appears in the outer end portions of the wires 12 of the front section 10. At the extreme forward ends of these wires 17 is fixed an outer and forward ring 18 having the same diameter as the ring 13 in the section 10. The wires 17 are further held in spaced apart alignment by an intermediate ring 19 secured to the outer sides of the curved portions of those wires 17. This ring 19 has in the present showing the same diameter as the ring 14 of the front section 10.

Bars 21, herein shown as four in number, are hinged by outer ends to the ring 16 by any suitable means, herein shown, Figs. 6 and 7, as by bending spaced apart fingers 22 and 23 around the ring 16. In each instance, the bar 21 is located to have its fingers 22 and 23 straddle a wire 17 so that the bar will be fixed in position circumferentially of the ring 16.

Over the outer end of each bar 21 is telescoped a flattened tubular member 24 having an eye 25 in its outer end through which a bolt or cap screw 26, Fig. 1, may be passed into the drive motor 27. That is, by securing the tubular members 24 through their eyes to the motor 27, the rear guard section 20 is fixed in position on the motor 27 to be located axially thereof by reason of the sliding engagement of the member 24 in each instance with its bar 21. Thus the section 20 may be applied to wide ranges of sizes of drive motors 27 by reason of the adjustability of the engaging members 24 on the hinged bars 21. The hinging of these bars permits the section 20 to be carried forwardly or rearwardly in respect to the motor 27 depending upon the fixed angle of the portion against which the members 24 will bear. In some instances (not shown) these bars 21 may extend directly rearwardly from the section 20 for motor attachment, or attachment to some supporting member where the motor is at a remote position.

The rear section 20 can be mounted directly on the motor 27 without having to remove the fan 28 from its mounting on the motor since the diameter of the ring 16 is sufficient to permit the manipulating of the section 20 thereover. The front section 10 may then be applied and secured to the rear section 20 by bringing the section 10 up to the section 20 to have the ring 13 come into contact and match against the ring 18. In this position, an encircling band 29, U-shape in cross section, Fig. 3, is brought around both of these rings 13 and 18 from their outer sides and this band pulled together end to end by any suitable means, such as by the bolt 30 passing through the respective upturned ears 31 and 32 that are fixed on the outer sides of the end portions of the band 29, and a nut 33 drawn up on the bolt 30 to effect the pulling snugly of the band 29 around those rings. Since the band 29 is U-shape in cross section, the downturned side flanges of the band prevent lateral displacement of the rings 13 and 18 in relation to each other, as well as vertical displacement by reason of the band being on the outer sides thereof.

The wires 12 form an effective guard around and across the forward side of the fan 28 and the guard so assembled forms a rigid unitary structure. For storage or shipping purposes, the front section 10 may be reversed to have its forward side dropped down inside the rear section 20 (or the rear section placed inside the front section) to nest one with the other so as to reduce the overall thickness of the two units. This is of considerable importance particularly where the guards are of comparatively large diameter and thickness for large fans.

It is thus to be seen that a more efficient and simple form of structure is provided and one that is adapted for use in a wide range of fan and motor sizes and particularly with different forms of motor housings and bolt receiving patterns, and while I have illustrated and described the invention in the one particular form, it is not intended that the invention be limited to that precise form beyond the limitations as may be imposed in the following claims, since it is obvious that mechanical changes may be made without departing from the spirit of the invention.

I claim:

1. A fan guard mounting comprising at least three bars; a fan guard; means for securing inner ends of said bars to said guard in spaced relation, circumferentially therearound; tubes slidingly telescoping over outer end portions of said bars; and mounting means on the outer ends of said tubes.

2. For mounting a fan guard on a motor, a fan guard; a plurality of bars exceeding two in number hinged by outer ends to said guard in a common circle and spaced one from the other circumferentially therearound; a member slidingly telescoping with each of said bars as an adjustable extension thereof; and motor engaging means on the outer end of each of said telescoping members; whereby said telescoping members may be individually secured by their outer ends to said motor either on an end or on the circumferential surface thereof and axially align the guard with the fan driven by the motor in the absence of securing means between said bars and said telescoping member.

JOHN H. VIEWEGH.

REFERENCES CITED

The following references are of record in the file of this patent:

UNITED STATES PATENTS

| Number | Name | Date |
| --- | --- | --- |
| 782,816 | Becker | Feb. 21, 1905 |
| 1,355,145 | Hoffine | Oct. 12, 1920 |
| 1,578,361 | Philp | Mar. 30, 1926 |
| 1,784,516 | Fairbanks | Dec. 9, 1930 |
| 1,846,634 | Fifils | Feb. 23, 1932 |
| 1,871,625 | Luff | Aug. 16, 1932 |
| 2,010,804 | Baker | Aug. 13, 1935 |
| 2,017,431 | Anderson et al. | Oct. 15, 1935 |
| 2,258,325 | Hess et al. | Oct. 7, 1941 |
| 2,345,516 | Weber | Mar. 28, 1944 |
| 2,389,824 | Smith | Nov. 27, 1945 |
| 2,421,833 | Cronstedt et al. | June 10, 1947 |